US008646794B2

(12) United States Patent
Mullin

(10) Patent No.: US 8,646,794 B2
(45) Date of Patent: Feb. 11, 2014

(54) THREE-WHEELED MOTORIZED VEHICLE

(76) Inventor: Craig Mullin, Independence, MO (US)

(*) Notice: Subject to any disclaimer, the term of this patent is extended or adjusted under 35 U.S.C. 154(b) by 0 days.

(21) Appl. No.: 13/529,251

(22) Filed: Jun. 21, 2012

(65) Prior Publication Data
US 2013/0341113 A1 Dec. 26, 2013

(51) Int. Cl.
B62K 11/00 (2013.01)
(52) U.S. Cl.
USPC .......................................................... 280/210
(58) Field of Classification Search
USPC .................. 180/210, 211, 213, 214, 215, 216
See application file for complete search history.

(56) References Cited

U.S. PATENT DOCUMENTS

| 2,202,810 | A | 6/1940 | Blanc | |
|---|---|---|---|---|
| 2,503,106 | A | 4/1950 | Fritz | |
| 2,606,623 | A | 8/1952 | Fickers | |
| 3,340,947 | A | 9/1967 | Hollinshead et al. | |
| 3,777,836 | A | 12/1973 | Riza | |
| 3,888,324 | A | 6/1975 | Kossow | |
| 4,325,565 | A * | 4/1982 | Winchell | 280/282 |
| 4,368,795 | A | 1/1983 | Tidwell | |
| 4,425,979 | A | 1/1984 | Young | |
| 4,703,824 | A * | 11/1987 | Irimajiri et al. | 180/215 |
| 6,276,480 | B1 | 8/2001 | Aregger | |
| 7,591,337 | B2 | 9/2009 | Suhre et al. | |
| 2008/0217085 | A1* | 9/2008 | Wernli | 180/210 |

* cited by examiner

Primary Examiner — Faye M. Fleming
(74) Attorney, Agent, or Firm — Erickson Kernell

(57) ABSTRACT

A three-wheeled motorized vehicle with a reverse trike or tadpole configuration is described. The vehicle includes a rear frame coupled to a single rear wheel and a front frame that is operatively coupled to a pair of front wheels mounted on opposite sides of the front frame. The rear frame is pivotably coupled to the front frame by a first coupling located along a top portion of the front frame and a second coupling located along a bottom portion of the front frame. The first coupling is located forward of the second coupling to provide a negative rake angle. Handlebars affixed to the front frame pivot the front frame, an engine mounted therein, and the front wheels about the first and second couplings. The location of the first and second couplings also causes the rear frame to lean out of a vertical plane when the front frame is pivoted.

20 Claims, 8 Drawing Sheets

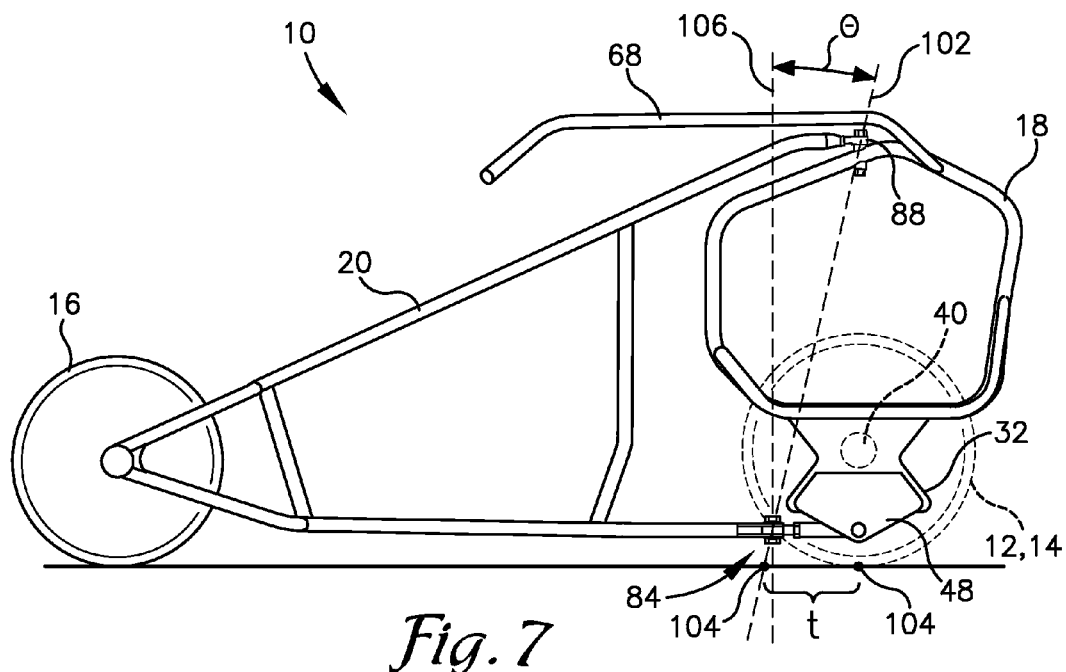
Fig. 7
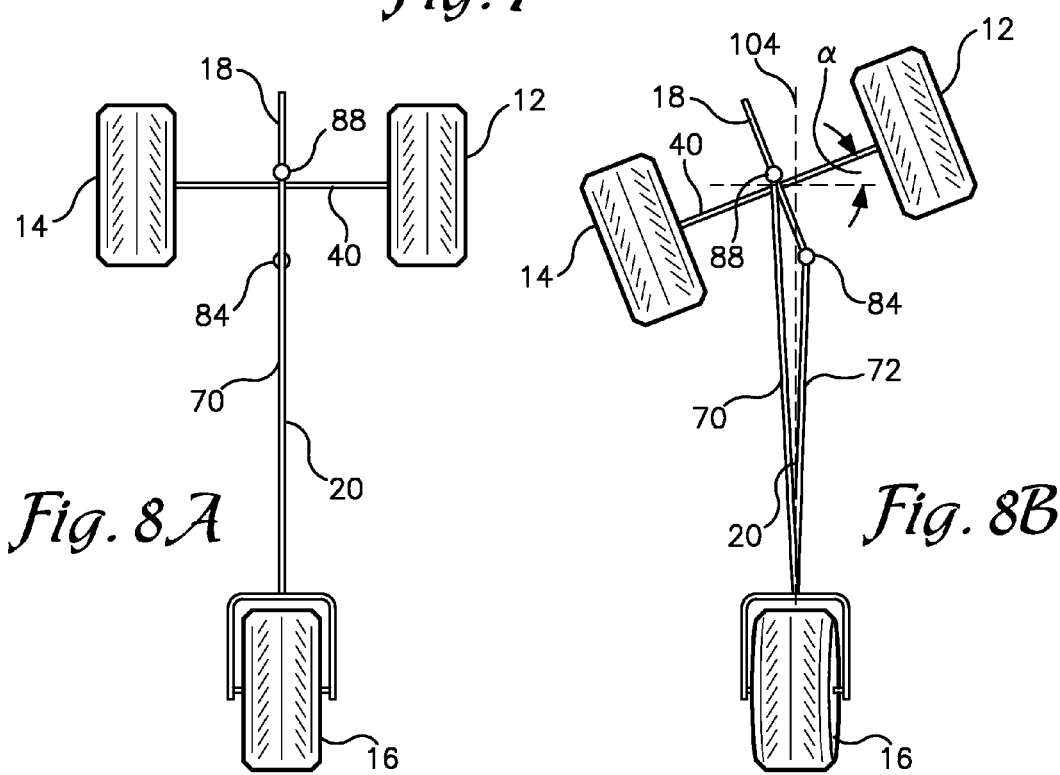
Fig. 8A
Fig. 8B

THREE-WHEELED MOTORIZED VEHICLE

BACKGROUND

Tricycles and motorized versions thereof have been available for well over a hundred years. Typically, motorized tricycles take one of two forms: a delta, configured with a single front wheel and a pair of rear wheels; or a tadpole, configured with a pair of front wheels and a single rear wheel. The delta form is often referred to as a trike while the tadpole version is referred to as a reverse trike. Both the trike and the reverse trike use a variety of configurations of engines, transmissions, suspension, and rider seating, among others.

Trikes and reverse trikes are often configured similar to motorcycles. This configuration places the engine under a rider and between the front and rear wheels. However other configurations that place the engine behind or in front of the rider are also employed. For example, U.S. Pat. No. 2,503,106 to Fritz describes a front-wheel drive three-wheeled scooter with a delta formation. The engine for the scooter is mounted on the front fork and thus pivots with the fork when the scooter is turned. And U.S. Pat. No. 7,591,337 to Suhre et al. describes a rear-drive reverse trike with the engine located within the main body of the vehicle below and in front of the rider. Other designs, like the Morgan Three-Wheeler from the Morgan Motor Company of Worcestershire, England, more closely resemble a three-wheeled automobile with suspension, steering, and overall layout more like that of a car than a motorcycle.

SUMMARY

Embodiments of the invention are defined by the claims below, not this summary. A high-level overview of various aspects of the invention are provided here for that reason, to provide an overview of the disclosure, and to introduce a selection of concepts that are further described in the Detailed-Description section below. This summary is not intended to identify key features or essential features of the claimed subject matter, nor is it intended to be used as an aid in isolation to determine the scope of the claimed subject matter.

In brief and at a high level, this disclosure describes, among other things, a reverse trike having a front frame supporting an engine and a pair of front wheels and a rear frame that is rotatably coupled to a rear wheel. The rear frame is pivotably coupled to the front frame by a first member that provides a first coupling to the front frame at a location substantially above the engine and by a second member that provides a second coupling to the front frame at a location substantially below the engine. The first and second couplings can be provided by heim or rose joints, e.g. a rod-end bearing.

Steering of the vehicle is thus completed by pivoting the front frame about the first and second couplings. The pivoting of the front frame also pivots the engine mounted therein and the front wheels about a central axis such that the wheels maintain the same Ackermann angle through a turn.

The first coupling is located forward of the second coupling to provide a reverse rake angle. As such, pivoting of the front frame about the first and second couplings causes the rear frame to lean away from a vertical plane and into a turn.

DESCRIPTION OF THE DRAWINGS

Illustrative embodiments of the invention are described in detail below with reference to the attached drawing figures, and wherein:

FIG. 7 is a side elevational skeleton view of the three-wheeled vehicle of FIG. 1 depicting a rake angle of the vehicle;

FIG. 8A is a top plan skeleton view of the three-wheeled vehicle of FIG. 1 depicting locations of the top and bottom couplings when the front and rear frames are aligned for straight travel of the vehicle;

FIG. 8B is a top plan skeleton view of the three-wheeled vehicle of FIG. 1 depicting locations of the top and bottom couplings when the front frame is pivoted about the first and second couplings for turning the vehicle;

DETAILED DESCRIPTION

Figure 1:
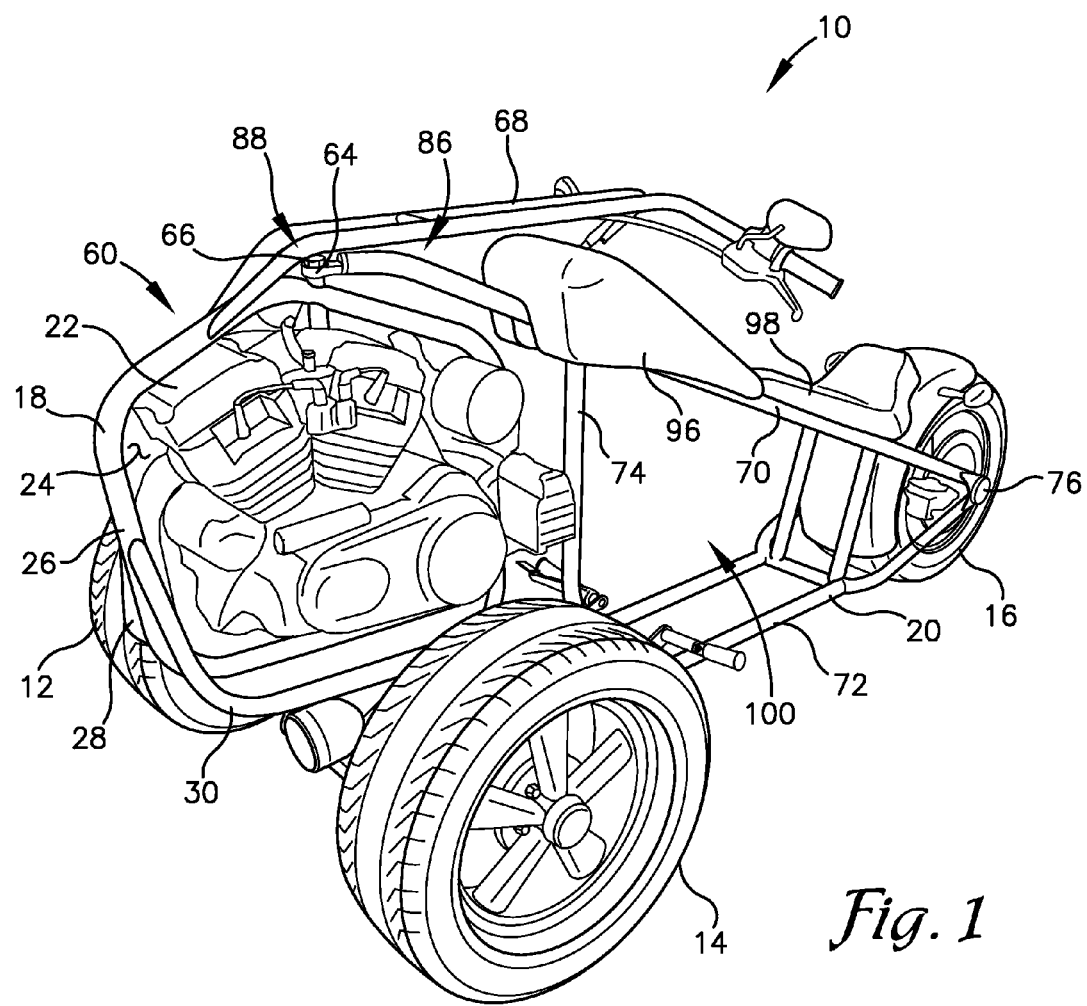
FIG. 1 is a perspective view of a three-wheeled vehicle depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components or combinations of components similar to the ones described in this document, in conjunction with other present or future technologies.

With reference to FIGS. 1-6, a three-wheeled vehicle 10 is described in accordance with an embodiment of the invention. The vehicle 10 is described herein with directional descriptors such as above, below, over, under, front, and rear. These descriptors are used to depict orientation or arrangement of components relative to the vehicle 10 resting on a horizontal ground surface and with respect to the direction of forward travel of the vehicle 10.

The vehicle 10 is configured as a tadpole or reverse trike having a pair of front wheels 12 and 14 and a single rear wheel 16. The vehicle 10 includes a front frame 18 and a rear frame 20. The front and rear frames 18, 20 are constructed from welded steel tubing but may be constructed in any desired manner and materials, such as, for example, machined components, structural shaped members, and bars made from, metals like steel and aluminum, plastics, composite materials, e.g. carbon-fiber or fiberglass, or the like.

The front frame 18 is configured to support an engine 22 and to operatively couple to the front wheels 12 and 14. The front frame 18 forms an engine cavity 24 within which the engine 22 is disposed. The front frame 18 can be configured to accommodate dimensions and mounting requirements of any desired engine 22 and associated components, e.g. transmission, differential, and the like.

The front frame 18 includes a primary member 26 that encircles the engine 22 in a vertical plane. A pair of secondary members 28, 30 branch off opposite sides of the primary member 26 near the front of the primary member 26 paralleling the path of the primary member 26 beneath the engine 22 and reconnecting with the primary member 22 at a point behind the engine 22. It is understood that one of skill in the art will recognize that a variety of configurations of the primary member 26 with or without the secondary members 28, 30 and/or other features might be employed in embodiments of the invention without departing from the scope described herein.

Figure 10:
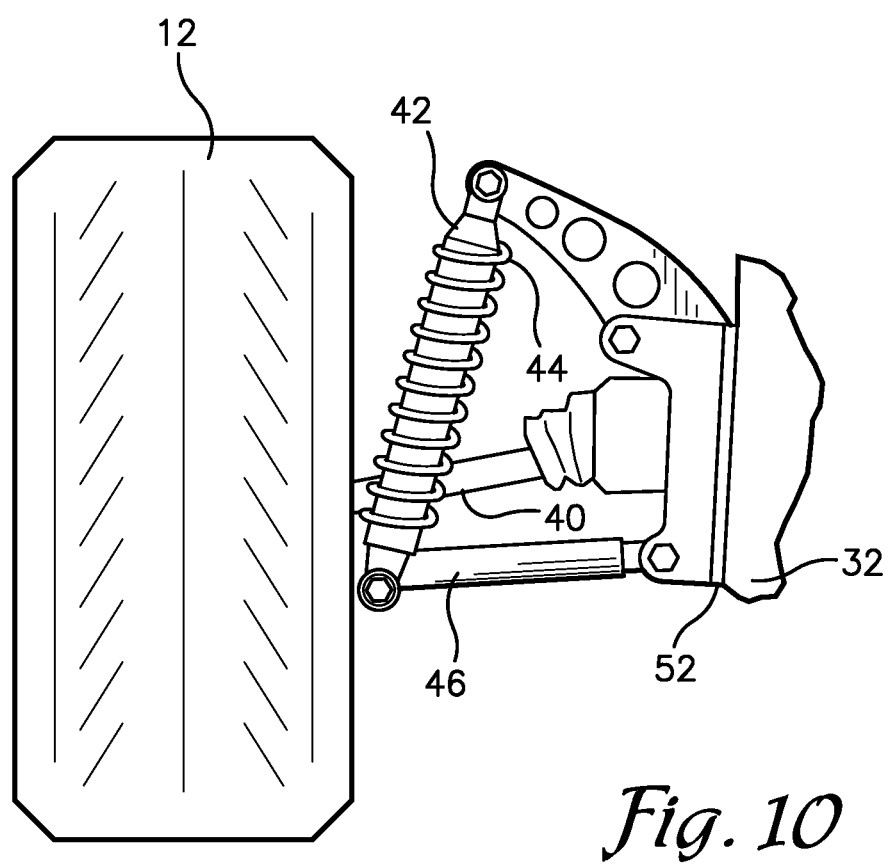
FIG. 10 is a partial front elevational view of a three-wheeled vehicle with front suspension components depicted in accordance with an embodiment of the invention.

The secondary members 28, 30 couple to a center or differential housing 32 beneath the engine 22 within which braking components 34, a drive sprocket 36, a differential 38, and associated components are disposed. The housing 32 is affixed to the secondary members 28, 30 using one or more bolts or can be welded, riveted, or otherwise attached. In an embodiment, the housing 32 is integral with the primary and/or secondary members 26, 28, 30. Axles 40 couple to the differential 38 in the housing 32 and extend outwardly therefrom to couple to respective right and left wheels 12, 14. Embodiments of the invention may include and, so as not to obscure the drawings, are depicted herein using a solid or fixed axle system 40 wherein the axles 40 extend through axle tubes fixed to the housing 32 and couple to the wheels 12 and 14. However, in other embodiments, independent suspension components, such as shocks 42, springs 44, swing arms 46, and the like are also coupled to the axles 40, the housing 32, and may couple to other portions of the front frame 18, as depicted in FIG. 10. In those embodiments the axles 40 include CV joints that allow the axles to flex as the wheels move with the suspension. In another embodiment, the front frame 18 includes a swing arm (not shown) or other suspension to which the engine 22 and axle 40 are mounted. Such a configuration may provide suspension to the front of the vehicle 10 while also restricting the front of the vehicle 10 from leaning during a turn.

A frame mount 48 is affixed along a lower portion of the housing 32 using one or more fixtures, such as bolts, or might be welded, riveted, or attached by another method. In an embodiment, the frame mount 48 is integral with the housing 32. The frame mount 48 includes a cross-member 50 that extends between opposite side plates 52, 54 of the frame mount 48 that are affixed to the housing 32 as describe above. A lower coupler 56 is disposed centrally along the length of the cross-member 50 between the side plates 52, 54. The lower coupler 56 is configured to couple to the rear frame 20 as described more fully below. The lower coupler 56 employs any form of coupler available in the art and as depicted in FIGS. 1-6 comprises a rod-end bearing, also known as a heim or rose joint. The lower coupler 56 includes a threaded rod that is threaded into a threaded aperture in the cross-member 50 of the frame mount 48. Alternatively, the lower coupler 56 might include a threaded, female shank that is threaded onto a threaded stud (not shown) extending from the cross-member 50. In an embodiment, the distance that the lower coupler 56 extends from the frame mount 48 toward the rear of the vehicle 10 is adjustable.

An upper coupler 58 is disposed along a top portion 60 of the front frame 18. The upper coupler 58 employs any form of coupler available in the art and can be the same or different than the lower coupler 56. As depicted in FIGS. 1-6, the upper coupler 58 comprises a bolt 62, stud, or similar component that is received by a rod-end bearing 64 on the rear frame 20 as described below. The bolt 62 is threaded into the front frame 18, coupled thereto via a nut 66 affixed to the bolt 60, or might be welded in place, among other configurations.

A set of handlebars 68 is also affixed to the front frame 18 along the top portion 60 thereof. The handlebars 68 might also be attached at any other location on the front frame 18. The handlebars 68 extend from the front frame 18 rearward toward a seating position of a rider to enable the rider to pivot the front frame 18 including the housing 32 and the frame mount 48 about the upper and lower couplers 58, 56 as described more fully below. Various components like a throttle, clutch, mirrors, blinker switches, and the like can be disposed on the handlebars 68 as known in the art.

Figure 2:
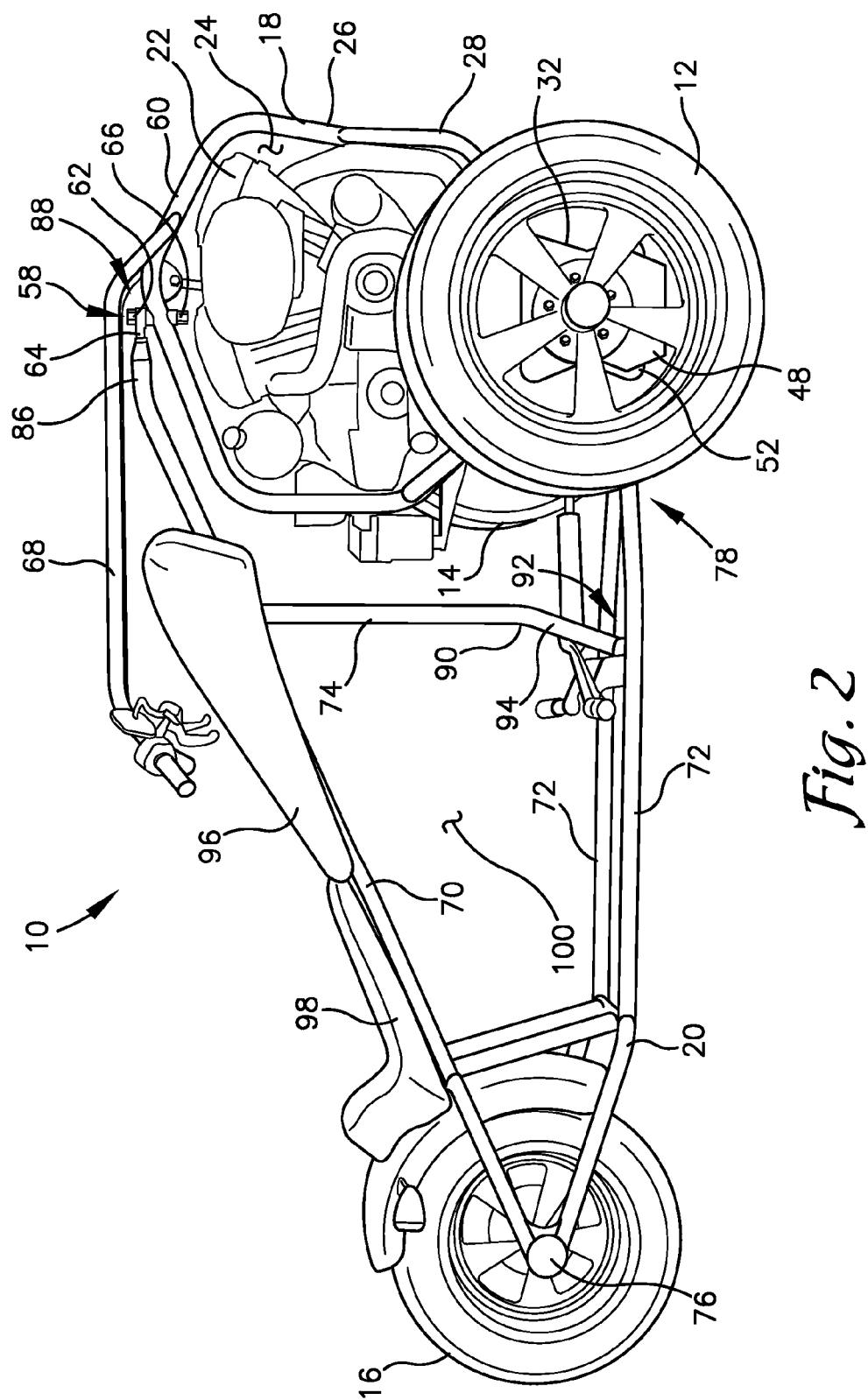
FIG. 2 is an elevational side view of the three-wheeled vehicle of FIG. 1.
Figure 3:
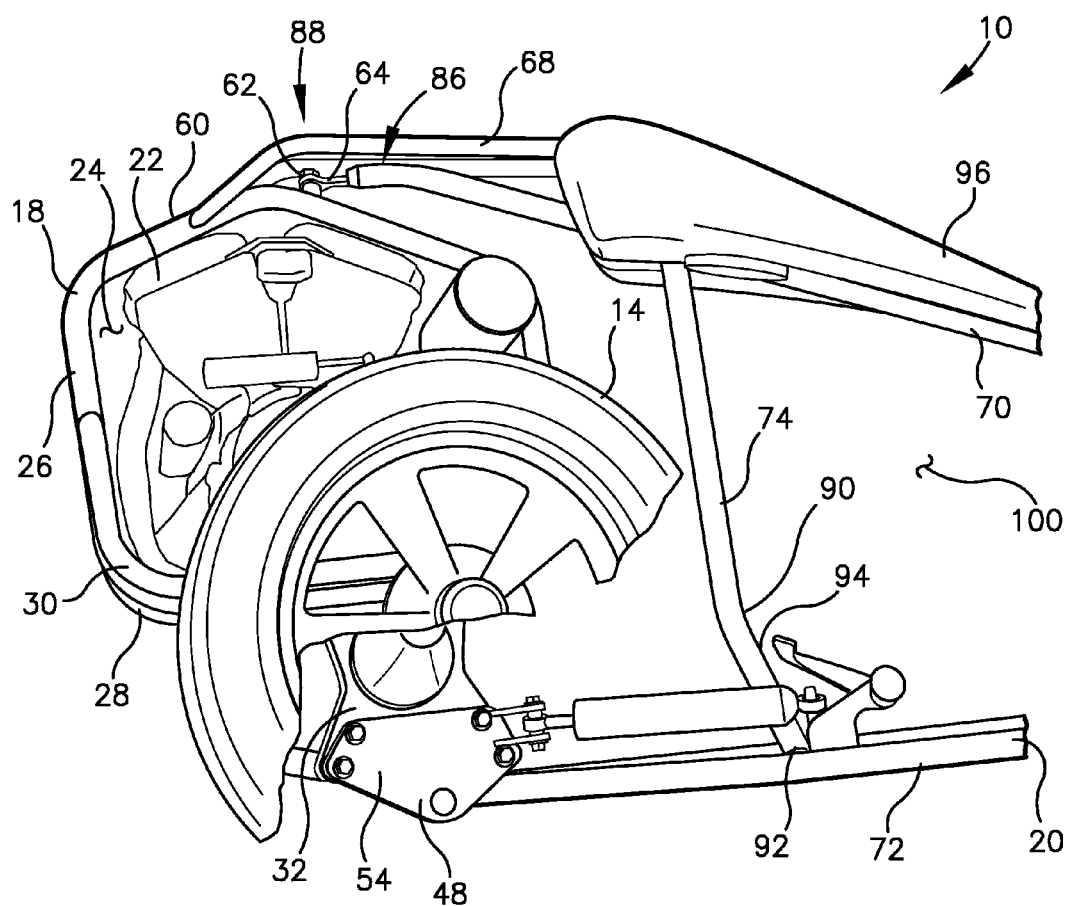
FIG. 3 is a partial side elevational view of the three-wheeled vehicle of FIG. 1.
Figure 4:
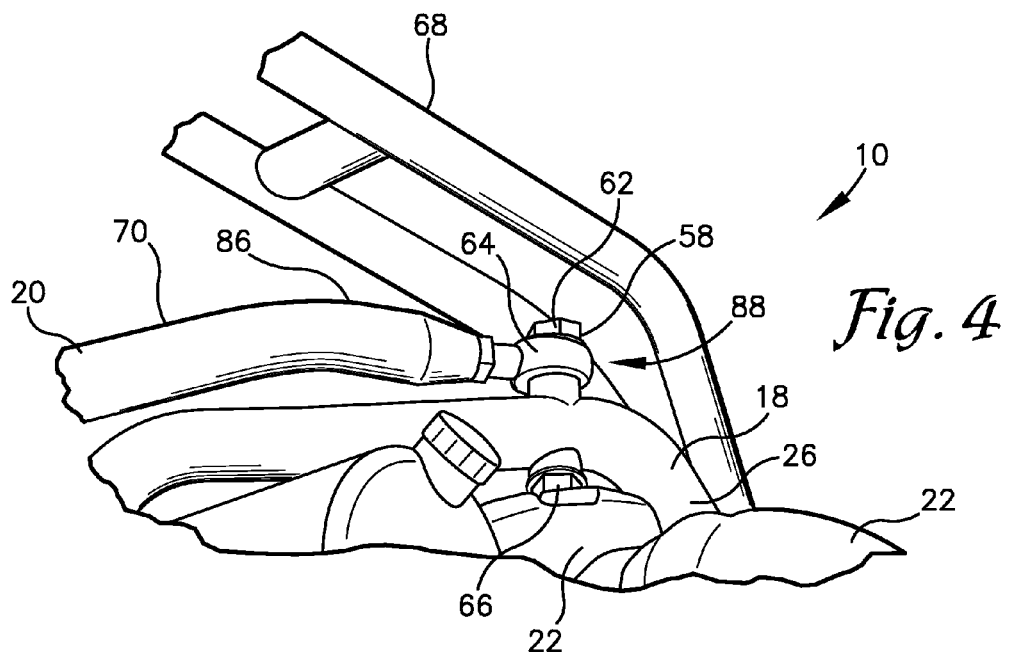
FIG. 4 is an enlarged view of a top coupling depicted in accordance with an embodiment of the invention.

With continued reference to FIGS. 1-2, the rear frame 20 includes a top member 70, a bottom member 72, and an upright support member 74. The top member 70 and bottom member 72 are joined at hubs 76 that support each side of the rear wheel 16 and extend from the hubs 76 at an acute angle. In an embodiment, the top and bottom members 70 and 72 support two or more rear wheels. The top and bottom members 70, 72 are referred to singularly but each member 70, 72 can comprise a plurality of sections affixed together, such as by welding. The bottom member 72 extends substantially horizontally from the hubs 76 on each side of the rear wheel 16 and converges at a distal end 78 that is configured to mate with the lower coupler 56 on the front frame 18.

Figure 5:
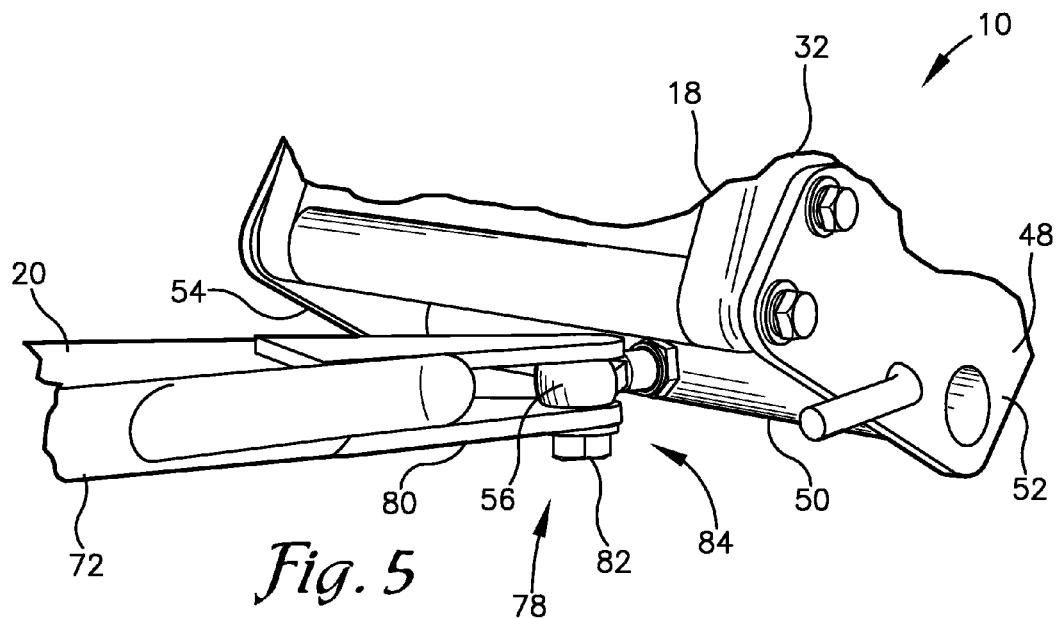
FIG. 5 is an enlarged view of a bottom coupling depicted in accordance with an embodiment of the invention.
Figure 6:
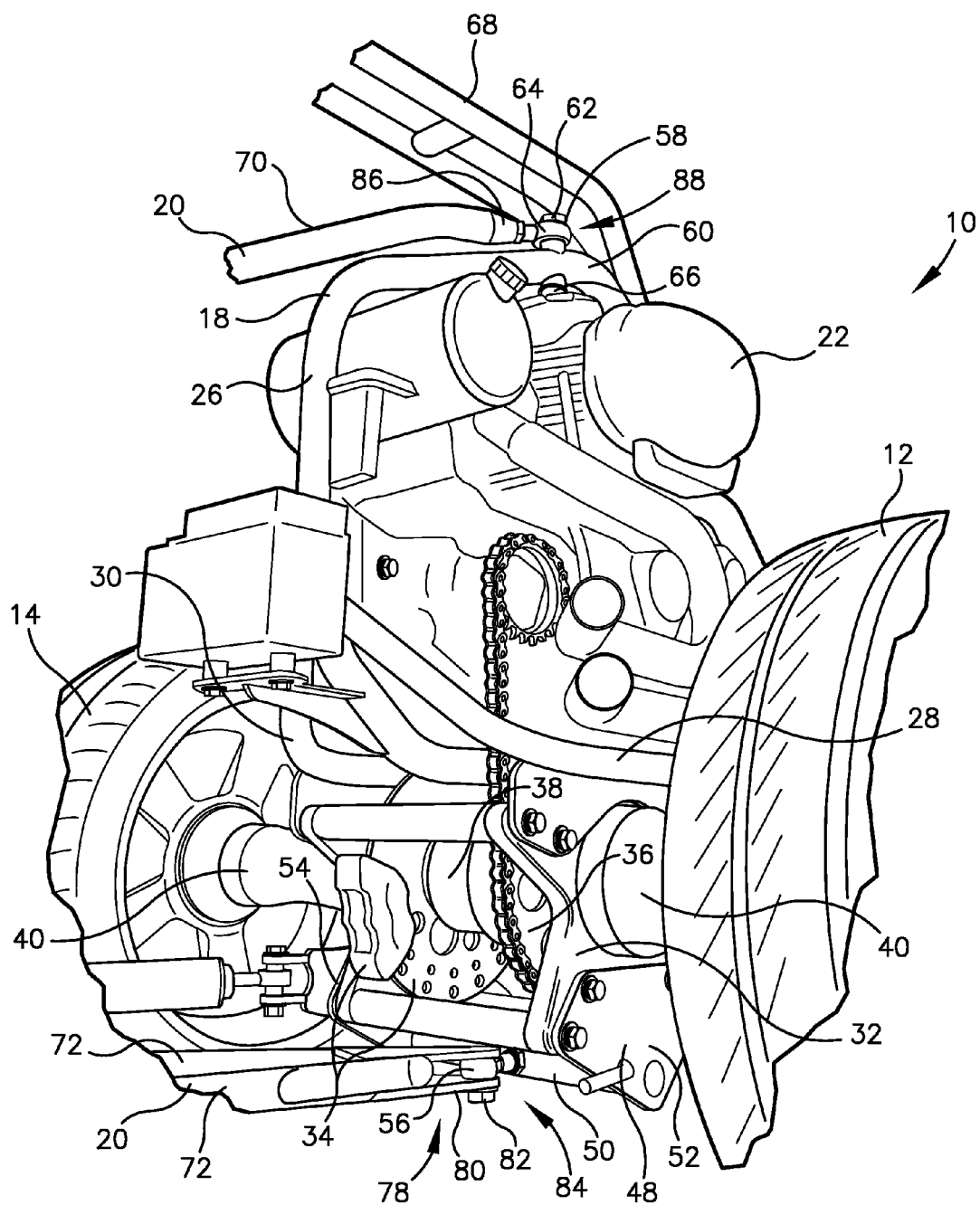
FIG. 6 is a perspective rear view of a front frame portion of the three-wheeled vehicle of FIG. 1.

As depicted in FIGS. 5 and 6, the distal end 78 of the bottom member 72 provides a clevis 80 that is configured to accept the rod-end bearing of the lower coupler 56 of the front frame 18 and is secured thereto via a bolt 82 inserted through the clevis 80 and the rod-end bearing of the lower coupler 56 to form a lower coupling 84. In another embodiment, the placement of the rod-end bearing of the lower coupler 56 and the clevis 80 are reversed such that the rod-end bearing is affixed to the bottom member 72 of the rear frame and the clevis 80 is integral with the frame mount 48 of the front frame 18.

The top member 70 of the rear frame 20 extends from the hubs 76 on each side of the rear wheel 16 at an upward angle and converges a short distance forward of the rear wheel 16 before extending to a distal end 86. The distal end 86 of the top member 70 includes the rod-end bearing 64 that mates with the upper coupler 58 of the front frame 18 to form an upper coupling 88. In another embodiment, the rod-end bearing 64 is replaced with any available form of coupler or similar component available in the art. The rod-end bearing 64 is threaded into the distal end 86 of the top member 70 or might be threaded onto a stud (not shown) extending from the distal end 86. In an embodiment, the placement of the bolt 62 on the front frame 18 and the rod-end bearing 64 on the rear frame 20 might be switched. In another embodiment, the rod-end bearing 64 is adjustable, such as by threading further into or out of the top member 70, to adjust the length of the top member 70.

The upright support 74 extends between the top member 70 and the bottom member 72 in a substantially vertical orientation. The upright support 74 includes a bend 90 near a lower end 92 and a lower segment 94 that extends from the upright segment 74 toward the rear of the vehicle 10 and to the bottom member 72 of the rear frame 20. In an embodiment, the bend 90 flexes to accept changes in the distance between the distal end 86 of the top member 70 and the distal end 78 of the bottom member 72 caused by adjusting the length of the top and bottom members 70, 72 via the upper and lower couplers 56, 58.

Various components can be disposed on the top and bottom members 70, 72 of the rear frame 20. For example, a fuel tank 96 and a seat 98 might be disposed on the top member 70 while brake pedals, gear shift levers, or the like might be disposed on the bottom member 72. These components, as well as other mechanical components, electrical components, fluid reservoirs, batteries, and storage compartments can be disposed in a space 100 between the top and bottom 70, 72 members.

With additional reference now to FIGS. 7-9, the operation of the vehicle 10 is described in accordance with an embodiment of the invention. As depicted best by FIG. 7 the upper coupling 88 is positioned forward of the lower coupling 84, e.g. the upper coupling 88 is a greater horizontal distance from the rear wheel 16 than the lower coupling 84. In an embodiment, the upper coupling 88 is positioned forward of the axles 40. This configuration provides a steering axis 102 with a reverse or negative rake angle, $\theta$. The steering axis 102 is the axis about which the steering mechanism, e.g. the front frame 18 pivots or rotates. And as known in the art, the rake angle is the angle between the steering axis 102 and an imaginary vertical line 106 measured counter-clockwise from the vertical line 106 when the vehicle 10 is viewed from the right. In an embodiment, the rake angle $\theta$ is between about $-2°$ and $-45°$ or might be between about $-4°$ and $-20°$. In another embodiment, the rake angle $\theta$ is between about $-5°$ and $-10°$.

As discussed previously, the rod-end bearings 64, 56 of the upper and lower couplings 84, 88 might be adjustable to change the length of the top and bottom members 70, 72. A change in the length of the top and/or bottom members 70, 72 also alters the rake angle $\theta$, e.g. lengthening the top member 70 and shortening or maintaining the length of the bottom member 72 produces a more negative rake angle $\theta$.

The negative rake angle arrangement also provides a negative trail. Trail t is defined as the horizontal distance from a point 108 at which the wheel 12, 14 touches the ground to a point 110 at which the steering axis 102 intersects the ground. In the configurations of the vehicle 10 described above, the point 108 is rearward of the point 110 and is thus considered a negative trail, e.g. in a vehicle with a positive rake angle the steering axis typically intersects the ground at a location that is forward of the point of contact of the wheel with the ground. In an embodiment, the absolute value of the negative trail t is between approximately 2 and 10 inches, or between about 2.5 and about 6 inches, or more preferably between about 3 and about 4 inches. Increasing the absolute value of the trail t may increase the steering stability of the vehicle 10, e.g. configurations with greater absolute values of the trail t tend to more easily maintain a straight forward, non-turning, alignment. For example, a bicycle with a larger trail t is more easily ridden with "no hands" than a bicycle with a shorter trail t.

Figure 9A:
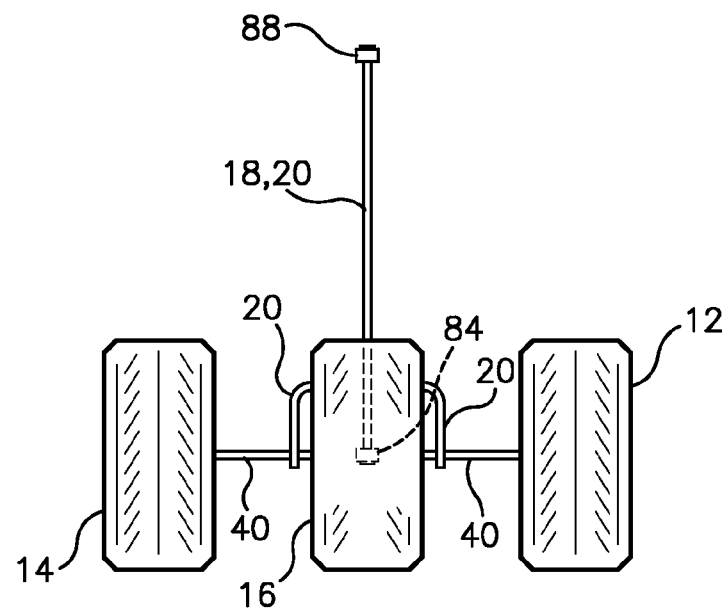
FIG. 9A is a rear elevational skeleton view of the three-wheeled vehicle of FIG. 1 depicting locations of the top and bottom couplings when the front and rear frames are aligned for straight travel of the vehicle.

With reference to FIGS. 8A-B, and 9A-B, the negative rake angle $\theta$ and orientation of the upper and lower couplings 88, 84 also cause the rear frame 20 to lean into a turn when the vehicle 10 is turned. As depicted in FIGS. 8A and 9A, the front and rear frames 18, 20 are aligned substantially in a single vertical plane 104 for straight forward or reverse travel. In this alignment the upper and lower couplings 88, 84 lie in the vertical plane 104 inline with the front and rear frames 18, 20.

Figure 9B:
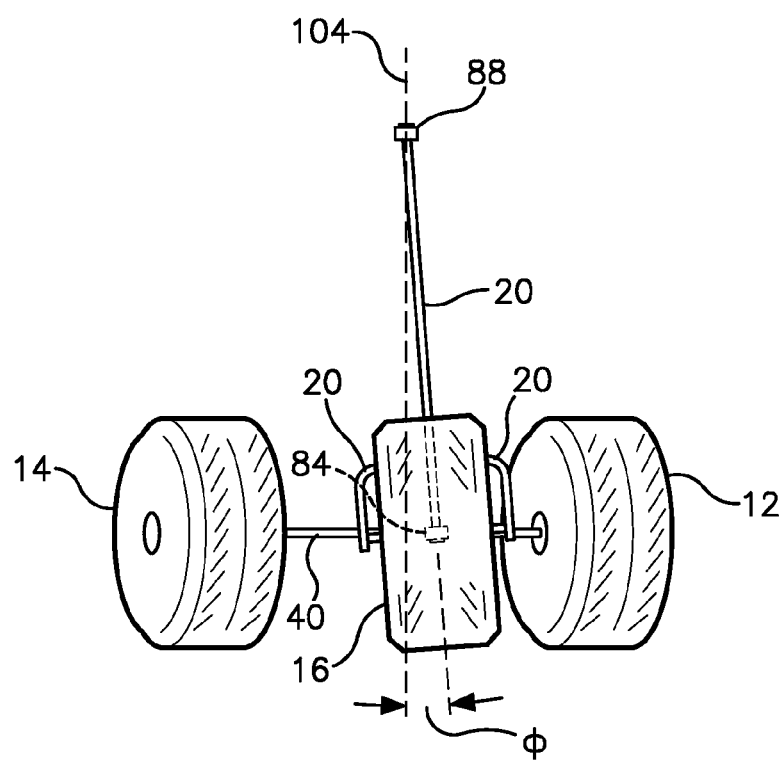
FIG. 9B is a rear elevational skeleton view of the three-wheeled vehicle of FIG. 1 depicting locations of the top and bottom couplings when the front frame is pivoted about the first and second couplings for turning the vehicle.

Pivoting the front frame 18 about the steering axis 102 disproportionately draws the upper and lower couplings 88, 84 out of alignment with the vertical plane 104, as depicted in FIGS. 8B and 9B. The pivoting positions the lower coupling 84 radially outwardly away from the direction of steering a greater distance than the upper coupling 88.

The rake angle $\theta$ and configuration of the front and rear frames 18, 20 define the movement of the upper and lower couplings 88, 84 caused by pivoting the front frame 18. For example, the upper coupling 88 might be drawn radially inward while the lower coupling is drawn radially outward. Or the upper coupling 88 might remain statically positioned with respect to front and rear frames 18, 20 while the lower coupling 84 is moved radially outwardly. Or both the upper and lower couplings 88, 84 might be drawn radially outward but by a different amount.

The unequal movement of the upper and lower couplings 88, 84 causes the rear frame 20 to lean out of the vertical plane 104. As depicted in FIGS. 8B and 9B, the top and bottom members 70, 72 of the rear frame 20 are forced out of vertical alignment by movement of the respective upper and lower couplings 88, 84. The top member 70 is thus positioned radially inwardly of the bottom member 72 resulting in the rear frame leaning out of the vertical plane 104 and into the turn. The amount of lean or angle of lean $\phi$ of the rear frame 20 into the turn with respect to a steering angle $\alpha$ increases as the steering angle $\alpha$ increases. The angle of lean $\phi$ is also configurable based on the rake angle $\theta$ and thus the length of the top and bottom members 70, 72 of the rear frame 20.

The rake angle $\theta$ might also be configured to increase stability of the vehicle 10. For example, larger, e.g. more negative, rake angles $\theta$ might decrease steering feedback felt by a rider when encountering obstructions in a roadway such as bumps, potholes, or the like. A sufficiently large rake angle $\theta$ might also enable a rider of the vehicle 10 to turn the vehicle 10 by leaning without directly moving the handlebars 68 to perform a turn.

With continued reference to FIGS. 7 and 8B, the front frame 18 maintains the substantially the same vertical orientation when pivoted about the steering axis 102. Further, pivoting the front frame 18 about the steering axis 102 also pivots the engine 22, front wheels 12, 14, and any other components mounted to the front frame 18.

As best depicted by FIG. 8B, the front wheels 12, 14 maintain alignment with respect to one another and pivot about a centrally located axis such that both wheels 12, 14 lie on a single radius of a circle formed by the turning vehicle 10, e.g. both of the wheels 12, 14 have the same Ackermann angle. This configuration eliminates the need for complex steering geometries and linkages designed to unevenly pivot the front wheels 12, 14 to provide or approximate Ackermann steering as is known in the art.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What claimed is:
1. A vehicle comprising:
a rear frame rotatably coupled to a rear wheel; and
a front frame operatively coupled to a pair of front wheels, the front frame being pivotably coupled to a first member of the rear frame by a first coupling positioned along an upper portion of the front frame and to a second member of the rear frame by a second coupling positioned along a lower portion of the front frame, the first coupling being positioned forward of the second coupling to provide a negative rake angle.

2. The vehicle of claim 1, further comprising:
an engine disposed in the front frame between the first coupling and the second coupling and configured to drive one or both of the front wheels; and
a set of handle bars coupled to the front frame and configured to pivot the front frame with respect to the rear frame about the first and second couplings.

3. The vehicle of claim 2, wherein the engine pivots with the front frame.

4. The vehicle of claim 2, wherein the pair of front wheels is pivoted with the front frame and each of the front wheels has the same steering angle.

5. The vehicle of claim 1, wherein one or more of the first and second couplings comprise a heim or rose joint.

6. The vehicle of claim 1, wherein pivoting the front frame about the first and second couplings and out of a normal position in line with the rear frame causes the rear frame to lean out of a vertical plane.

7. The vehicle of claim 1, wherein the negative rake angle is between about −30 and about −2 degrees, inclusive.

8. The vehicle of claim 1, wherein the rear frame includes a seat for a rider and a cavity beneath the seat in which one or more of mechanical components, electrical components, fluid reservoirs, and storage compartments are disposed.

9. The vehicle of claim 1, wherein the rear frame is rotatably coupled to a single rear wheel.

10. A frame for a vehicle comprising:
a rear member configured to rotatably couple to a rear wheel and providing a first and a second coupling that are spaced apart vertically;
a front member configured to operatively couple to a pair of front wheels and to support an engine mounted within an engine cavity of the front member, the front member being pivotally coupled to the first coupling of the rear member at a location on the front member that is above the engine cavity and being pivotally coupled to the second coupling of the rear member at a location on the front member that is beneath the engine cavity.

11. The frame of claim 10, wherein the first coupling is located forward of and further from the rear wheel than the second coupling and the first and second couplings provide a negative rake angle.

12. The frame of claim 11, wherein the negative rake angle is between about −30 and about −2 degrees, inclusive.

13. The frame of claim 10, wherein one or more of the first and second couplings include a heim or rose joint.

14. The frame of claim 10, wherein one or more of the first and second couplings are adjustable to change the rake angle.

15. The frame of claim 10, further comprising:
a set of handlebars fixedly attached to the front member and configured to pivot the front member about the first and second couplings.

16. The frame of claim 15, wherein pivoting the front member about the first and second couplings and away from a normal position in line with the rear member causes the rear member to lean out of a vertical plane.

17. The frame of claim 16, wherein an angle of lean of the rear member out of the vertical plane increases as the rake angle becomes more negative.

18. A motor vehicle having a pair of leading wheels and a single rear wheel, the motor vehicle comprising:
a pair of leading wheels;
a single rear wheel;
an engine configured to drive one or both of the leading wheels;
a front frame supporting the engine and the pair of leading wheels;
a rear frame pivotably coupled to the front frame by a first coupling located vertically above the engine and by a second coupling located vertically below the engine, and rotatably coupled to the rear wheel, the first coupling being located forward of the second coupling to form a negative rake angle;
a set of handlebars fixedly attached to the front frame and configured to pivot the front frame about the first and second couplings.

19. The motor vehicle of claim 18, wherein pivoting the front frame by the handlebars rotates the engine and the pair of leading wheels, and wherein the leading wheels have the same steering angle.

20. The motor vehicle of claim 18, wherein the negative rake angle causes the rear frame to lean into a turn when the handlebars are pivoted to turn the motor vehicle.

* * * * *